(12) United States Patent
Schloter et al.

(10) Patent No.: US 10,044,938 B2
(45) Date of Patent: Aug. 7, 2018

(54) METHOD AND APPARATUS FOR PROCESSING IMAGES OF RECEIPTS

(71) Applicant: ABUKAI, Inc., San Francisco, CA (US)

(72) Inventors: Philipp Schloter, San Francisco, CA (US); Matthias Jacob, Bad Tolz (DE)

(73) Assignee: ABUKAI, INC., San Francisco, CA (US)

( * ) Notice: Subject to any disclaimer, the term of this patent is extended or adjusted under 35 U.S.C. 154(b) by 671 days.

(21) Appl. No.: 13/762,655

(22) Filed: Feb. 8, 2013

(65) Prior Publication Data

US 2013/0201307 A1 Aug. 8, 2013

Related U.S. Application Data

(60) Provisional application No. 61/596,661, filed on Feb. 8, 2012.

(51) Int. Cl.
| | | |
|---|---|---|
| *G02B 23/12* | (2006.01) | |
| *G02B 7/30* | (2006.01) | |
| *G06K 9/00* | (2006.01) | |
| *G06Q 20/32* | (2012.01) | |
| *G06Q 20/40* | (2012.01) | |
| *H04N 5/232* | (2006.01) | |

(52) U.S. Cl.
CPC ..... *H04N 5/23293* (2013.01); *H04N 5/23229* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,260,899 A | * | 4/1981 | Baker | G01N 21/8901 250/559.49 |
| 5,144,122 A | * | 9/1992 | Danley | G01J 5/02 250/201.2 |
| 5,504,319 A | * | 4/1996 | Li | G06K 7/14 235/462.08 |
| 6,426,771 B1 | * | 7/2002 | Kosugi | H04N 5/772 345/555 |
| 7,069,240 B2 | * | 6/2006 | Spero | G06Q 20/20 705/26.35 |
| 7,305,129 B2 | * | 12/2007 | Chellapilla | G06F 17/243 382/174 |
| 7,746,510 B2 | * | 6/2010 | Pandipati | G06Q 40/00 235/375 |
| 7,792,709 B1 | * | 9/2010 | Trandal | G06Q 30/02 705/26.1 |
| 8,442,844 B1 | * | 5/2013 | Trandal | G06Q 30/012 705/35 |
| 8,688,579 B1 | * | 4/2014 | Ethington | G06Q 40/02 705/35 |
| 2001/0042026 A1 | * | 11/2001 | Hinh | G06Q 10/02 705/5 |
| 2003/0011791 A1 | * | 1/2003 | Ejima | H04N 1/00068 358/1.2 |

(Continued)

*Primary Examiner* — Ig T An

(74) *Attorney, Agent, or Firm* — Lowenstein Sandler LLP

(57) ABSTRACT

Systems and methods of processing images of expense receipts are provided. Images of expense receipts are received from an image capture device and an image filter is used to process the images. The filtered images are displayed to the user in a real-time preview portion of a user interface.

20 Claims, 8 Drawing Sheets

(56) References Cited

U.S. PATENT DOCUMENTS

| | | | |
|---|---|---|---|
| 2003/0123696 A1* | 7/2003 | Matsumoto | H04N 1/00867 382/100 |
| 2003/0164841 A1* | 9/2003 | Myers | H04N 13/261 345/619 |
| 2004/0181749 A1* | 9/2004 | Chellapilla | G06F 17/243 715/222 |
| 2004/0193538 A1* | 9/2004 | Raines | G06Q 20/0453 705/39 |
| 2005/0010505 A1* | 1/2005 | Darrell | G06Q 20/0453 705/35 |
| 2005/0127165 A1* | 6/2005 | Currey | G06Q 20/0453 235/380 |
| 2007/0095909 A1* | 5/2007 | Chaum | G07C 13/00 235/386 |
| 2008/0249951 A1* | 10/2008 | Gilder | G06Q 20/04 705/76 |
| 2009/0196501 A1* | 8/2009 | Ma | G06K 9/38 382/169 |
| 2009/0271265 A1* | 10/2009 | Lay | G06O 20/0453 705/14.38 |
| 2010/0082454 A1* | 4/2010 | Narayanaswami | G06Q 20/20 705/26.1 |
| 2011/0125561 A1* | 5/2011 | Marcus | G06Q 20/32 705/14.15 |
| 2014/0207680 A1* | 7/2014 | Rephlo | G06Q 20/322 705/44 |
| 2017/0371929 A1* | 12/2017 | Collier | G06F 17/30477 |

* cited by examiner

METHOD AND APPARATUS FOR PROCESSING IMAGES OF RECEIPTS

CROSS-REFERENCE TO RELATED APPLICATIONS

This application claims the benefit of U.S. Provisional Application No. 61/596,661, titled "REAL-TIME IMAGE PROCESSING FOR RECEIPT IMAGE CAPTURE ON MOBILE DEVICE," filed on Feb. 8, 2012, the contents of which are hereby incorporated by reference herein.

TECHNICAL FIELD

Embodiments of the present invention relate to data processing, and more specifically, to processing images of expense receipts.

BACKGROUND

Many companies and/or businesses will often have an employee pay for their expenses first and will reimburse the employee for their expenses later. Expense reports are generally used to track the time, date, amount, vendor, service provider, location, currency, and/or other information associated with these expenses. Employees often spend a significant amount of time creating expense reports. Employees often need to collect physical receipts and ensure they do not lose them prior to completion of their expense report. They may manually enter a range of information from the receipt into a computer system, spreadsheet, device application, or online portal to complete the report. They may also categorize the receipts manually (e.g., receipt for dinner, etc.). In many cases the employee may also convert the currencies on the receipts to local currencies on the expense report. In addition, the employee may also need to submit physical copies of the receipts with the expense report. Even after all of the employee's work, a third person (e.g. in finance or accounting) may double-check whether the information on receipts has been entered correctly by the employees and whether the proper category for each expense was elected.

Many companies, businesses, and/or other business entities may have employees provide copies of their receipts and submit copies of the receipts with their expense reports. Printing photographs of the receipts (taken by digital cameras, cellular phones, smartphones, and/or other cameras) may cause an employer to use ink (e.g., color ink or toner) more quickly. Also, many companies, businesses, and/or other business entities may have procedures or guidelines that indicate that the receipts submitted with expense reports look like actual photocopies and/or faxes of the receipts, and may not accept digital images (e.g., digital photographs) of receipts. In addition, transmitting color images of receipts to other computing devices (such as a server) may use more bandwidth and storage space than submitting black-and-white, gray-scale and/or otherwise compressed receipt images. In addition, some corporate backend systems, document archiving, accounting or expense systems may have size limitations (e.g., memory and/or file size limitations) for uploaded files (e.g., images of receipts). A full color photograph of a receipt may still exceed the size limitations even when compressed. Furthermore, computing devices (such as smartphones) often have limited network bandwidth and/or limited data usage available (e.g., cellular services providers may limit the amount of data a user may transmit and/or receive). Larger image files of receipts may take longer to upload to a server and may also use a larger amount of a user's allowed data usage.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

DETAILED DESCRIPTION

Figure 1A:
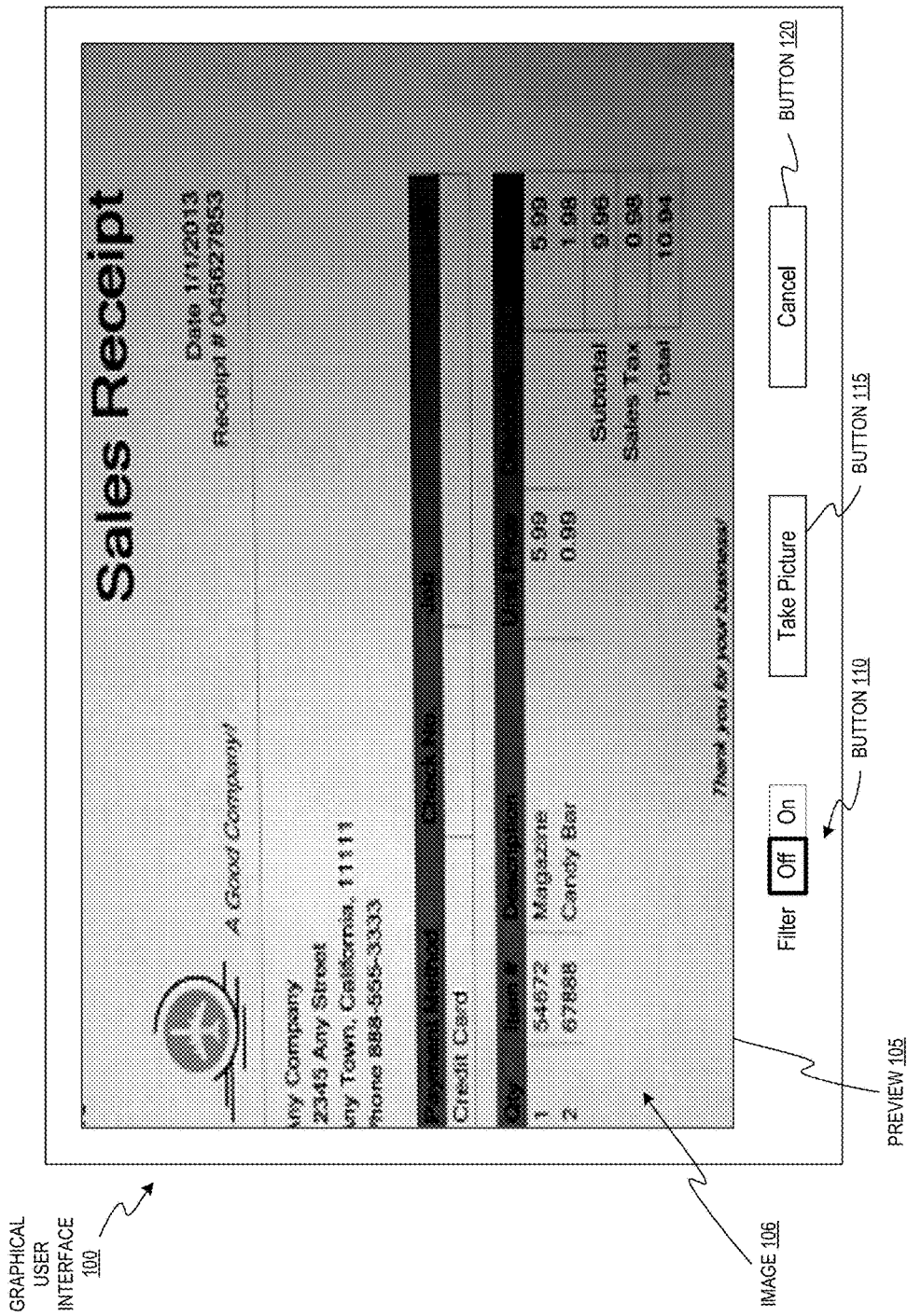
FIG. 1A is an example graphical user interface including a preview of an image of an expense receipt, according to one embodiment.

Embodiments of the disclosure provide a mechanism for processing images of expense receipts. An expense receipt (or a receipt) may be one or more of an invoice, form, bill, a certificate, a declaration, a letter, a notice, a proof of purchase, a sales slip, a stub, a voucher and/or any other document that includes information about a product and/or a service that has been purchased, bought, and/or paid for by a user. A computing device (e.g., a smart phone, a tablet computer, etc.) may include an image capture device (e.g., a digital camera) that captures images of expense receipts. The user device may provide a graphical user interface (GUI) that allows a user to view a preview of an expense receipt before capturing an image (e.g., taking a photograph or a color image) of the expense receipt. The preview may be a series of images (e.g., image data) received from the image capture device. The preview may also be a real-time preview of the expense receipt. For example, the image capture device may constantly obtain and/or capture images of the expense receipt (e.g., may obtain and/or capture image data). As the user moves and/or repositions the image capture device, the images of the expense receipt may be from a different angle, position, distance, etc. The preview may display the images of the expense receipt as the user moves and/or repositions the image capture device in real-time and/or in near real-time.

In one embodiment, the user may activate an image filter that may be used to process (e.g., may be applied to) the images (e.g., image data) received from the image capture device. The filter may turn the images received from the image capture device into black-and-white and/or gray-scale images. For example, the image filter may process the images (e.g., the image data) to generate filtered image data (e.g., black-and-white and/or gray-scale images). The blackand-white and/or gray-scale images may emulate and/or simulate (e.g., look like) a photocopy of the expense receipt. For example, the black-and-white and/or gray-scale image of the expense receipt may look like the expense receipt has been copied using a photocopier, a copy machine, a fax machine, a Xerox® machine, etc. The image filter may be also used to process the image data in real-time. For example, the preview may display black-and-white and/or gray-scale images instead of color images. The image filter may also allow users to reduce the size (e.g., file size) of an image of an expense receipt. This may allow the user to transmit the image of the expense receipt from a computing device or other device to another computing device (e.g., a server) more quickly. This may also reduce the amount of data transmitted and/or received by the computing device (e.g., may reduce the bandwidth or data usage). In one embodiment, contextual data (such as date the image was taken, location wherein the image was taken, etc.) may also be obtained and may be transmitted to the expense processing system. The contextual data may be sent as additional data or may be added to metadata of the image of the expense receipt (e.g., included as part of the image data and/or filtered image data).

In another embodiment, the computing device may apply multiple image filters to the images received from the image capture device and may display the filtered images in the preview. The computing device may also determine the size of the receipt. For example, the computing device may use multiple image capture devices and/or other sensors on the computing device. The computing device may also determine the size of the receipt based on the type and/or category of the receipt.

Embodiments of the present disclosure may refer to a method and apparatus for processing expense receipts as described in the U.S. patent application Ser. No. 13/349,536 titled "METHOD AND APPARATUS FOR PROCESSING RECEIPTS" and filed on Jan. 12, 2012, the contents of which are hereby incorporated by reference herein.

This disclosure sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely examples. Particular implementations may vary from these example details and still be contemplated to be within the scope of the present disclosure. It should be understood that although the present disclosure refers to expense receipts, the embodiments described herein may also be other documents such as invoices, tax documents, etc.

FIG. 1A is an example graphical user interface (GUI) 100 including a preview 105 of an image 106 of an expense receipt, according to one embodiment. The GUI 100 also includes button 110, button 115, and button 120. The GUI 100 may be included in an application (or a service, a daemon, a script, a software module, and/or a software component that resides on computing device, such as a smartphone or a tablet computer). The application may allow a user to capture images of receipts and transmit images of receipts to an expense processing system (as discussed below in conjunction with FIGS. 2 and 5). The GUI 100 may allow a user to capture an image (e.g., take a digital picture or photograph) of an expense receipt. The image of the expense receipt may be received from an image capture device (e.g., a digital camera, a video camera, etc.). The image of the expense receipt may be transmitted to an expense processing system and the expense processing system may use the image of the expense receipt to generate an expense report.

The preview 105 may display images one or more expense receipts (or of other objects and/or items) received from the image capture device. Examples of an image capture device may include, but are not limited to, a digital camera, a video camera, a camcorder, a scanner, any device capable of capturing images, and/or software associated with such devices. The image capture device may generate and/or provide multiple images of objects (such as expense receipts) and may transmit the multiple images to the application which may present the images in the preview 105. In one embodiment, the preview 105 may perform the functions of a viewfinder for the image capture device. For example, the preview 105 may allow a user to view one or more objects from the viewpoint of the image capture device. As illustrated in FIG. 1A, the preview 105 displays an image 106 of an expense receipt (e.g., a Sales Receipt from Any Company). The user may use the GUI 100 to take an image, picture, and/or photograph of the expense receipt. The preview 105 may display the images of the expense receipt as the user moves and/or repositions the image capture device in real-time and/or in near real-time (e.g., there may be a delay to process the image data received from the image capture device and display the images in the preview 105). The image data may be data that is used to represent an image (e.g., a digital image or a digital photograph) of an expense receipt. For example, the image data may be one or more image files received from the image capture device.

A user may provide user input to the application via the button 110, button 115, and/or button 120. The button 110 allows a user to activate and/or deactivate an image filter (as discussed below in conjunction with FIG. 1B) that may be used to process the images displayed in the preview 105. The button 110 includes two portions, an "On" portion and an "Off" portion. As illustrated in FIG. 1A, the "Off" portion of the button 110 is selected and/or highlighted, indicating that the image filter should not be used to process the images (e.g., should not be applied to the images) displayed in the preview 105. The user may provide user input (e.g., may tap the button 110, may swipe towards the right on the button 110) to activate the image filter and the application may process the images received from the image capture device (e.g., the image data) using the image filter. Button 115 may allow a user to take a picture (e.g., capture an image) of the expense receipt. For example, after reviewing the preview 105, the user may click on the button 115 to capture an image (e.g., take a digital picture) of the expense receipt. The captured image of the expense receipt may be a color photo or image. The button 120 may allow the user to cancel and/or terminate an image capture process (e.g., allowing the user to exit the application or close the preview 105 of the GUI 100). For example, the user may click the button 120 to indicate that the user no longer wishes to user the image capture device (e.g., the user may refrain from capturing an image).

Figure 1B:
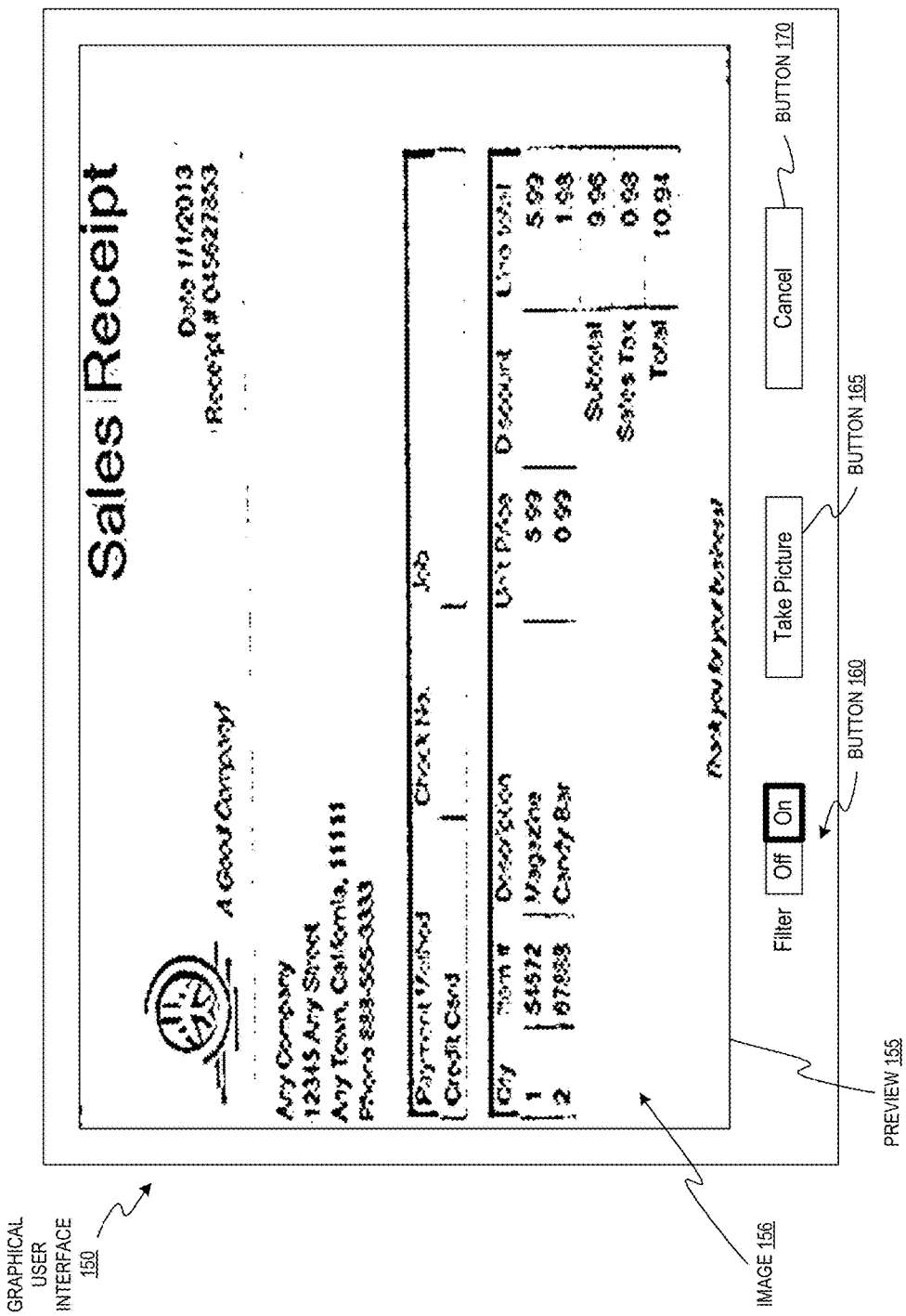
FIG. 1B is an example graphical user interface including a preview of an image of an expense receipt, according to another embodiment.

FIG. 1B is an example graphical user interface including a preview of an image of an expense receipt, according to another embodiment. The GUI 150 also includes button 160, button 165, and button 170. The GUI 150 may be included in an application (or a service, a daemon, a script, a software module, and/or a software component that resides a computing device, such as a smartphone or a tablet computer). The application may allow a user to transmit receipts or images of receipts to an expense processing system (as discussed below in conjunction with FIGS. 2 and 5). The GUI 150 may allow a user to capture an image of an expense receipt. The image of the expense receipt may be received from an image capture device (e.g., a digital camera, a video camera, etc.). The image of the expense receipt may be transmitted to an expense processing system and the expense processing system may use the image of the expense receipt to generate an expense report.

A user may provide user input to the application via the button 160, button 165, and/or button 170. The button 160 allows a user to activate and/or deactivate an image filter (as discussed below in conjunction with FIG. 1B) that may be used to process the images displayed in the preview 155. The button 160 includes two portions, an "On" portion and an "Off" portion. As illustrated in FIG. 1B, the "On" portion of the button 160 is selected and/or highlighted, indicating that the filter should be used to process the images (e.g., should be applied to the images) displayed in the preview 155. The user may provide user input (e.g., may tap the button 160, may swipe towards the left on the button 160) to deactivate the image filter and the application may not process the images received from the image capture device (e.g., the image data) using the image filter. Button 165 may allow a user to take a picture of the expense receipt. For example, after reviewing the preview 155, the user may click on the button 165 to capture an image of the expense receipt. The computing device may capture an image (e.g., take a photograph) of the expense receipt and may apply the image filter to the image to obtain a filtered image of the expense receipt. The button 170 may allow the user to cancel and/or terminate an image capture process (e.g., allowing the user to exit the application or close the preview 155 of the GUI 150). For example, the user may click the button 170 to indicate that the user no longer wishes to user the image capture device (e.g., the user may refrain from capturing an image).

The preview 155 may display images one or more expense receipts (or of other objects and/or items) received from the image capture device. The image capture device may generate and/or provide multiple images of objects (such as expense receipts) and may transmit the multiple images to the application which may present the images in the preview 155. In one embodiment, the preview 155 may perform the functions of a viewfinder for the image capture device. For example, the preview 155 may allow a user to view one or more objects from the viewpoint of the image capture device. As illustrated in FIG. 1B, the preview 155 displays a filtered image 156 of an expense receipt (e.g., a Sales Receipt from Any Company). The user may use the GUI 150 to take an image, picture, and/or photograph of the expense receipt. The preview 105 may display the images of the expense receipt as the user moves and/or repositions the image capture device in real-time and/or in near real-time (e.g., there may be a delay to process the image data received from the image capture device and display the images in the preview 105).

As discussed above, the user has activated the image filter (e.g., by clicking on the button 110 illustrated in FIG. 1A) as indicated by the button 160. The application may process images (e.g., image data) received from the image capture device using the image filter (e.g., may apply the image filter to the image data). For example, referring to FIG. 1A, the image 106 may be processed using the image filter to generate the filtered image 156 (e.g., filtered image data). Filtered image data may be image data that has been processed using one or more image filters. For example, filtered image data may include an image that has been processed using an image filter. Applying the image filter to the image 106 may cause the filtered image 156 to look like a photocopy of the expense receipt instead of a photograph of the expense receipt. For example, the filtered image 156 of the expense receipt may look like the expense receipt has been copied using a photocopier, a copy machine, a fax machine, a Xerox® machine, etc.

In one embodiment, the image filter may increase the legibility of information in the receipt (e.g., names of items, quantity, descriptions of items or services, prices, address, phone numbers, names of businesses, etc.). The filtered image 156 may be a black-and-white and/or a gray-scale image. This may allow the filtered image 156 to use less storage space (e.g., have a smaller file size) than the image 106 (e.g., a color image) of FIG. 1A. For example, the image 106 may be a full color image or photo that uses two megabytes of storage space and the filtered image 156 may use ten kilobytes of storage space. In one embodiment, the filtered image 156 may be stored in black-and-white format (e.g., a binary or 1-bit format), a gray-scale format (e.g., an 8-bit format) and/or other color formats that require less storage than a full color image format used by the image capture device. Because the filtered image 156 may use less storage space than a typical digital photo (e.g., full color photo or image) captured by the image capture device, a computing device may be able to reduce the amount of data (e.g., the amount of bandwidth) used by the computing device when transmitting the filtered image 156. The filtered image 156 may also allow a user to use less ink when printing the filtered image 156. As illustrated in FIG. 1B, a large portion of the filtered image 156 is white, and the white portions of the filtered image 156 may not use ink when the filtered image 156 is printed.

In one embodiment (not shown in the figures), the GUI 150 may include two previews. For example, the GUI 150 may include the preview 105 (as illustrated in FIG. 1A) and the preview 155. This may allow users to compare the image 106 (e.g., the full color image) of the expense receipt with the filtered image 156 (e.g., the black-and-white image) of the expense receipt. In another embodiment (not shown in the figures), the GUI 150 may overlay the filtered image 156 over the image 106 in the preview 155. For example, the filtered image 156 may be semi-transparent and may be positioned and/or overlaid over the image 106. This may allow also allow the user to compare the image 106 and the image 156.

In one embodiment, the preview 155 allows users to see how an image may look when the image filter is applied to the image (e.g., when the image data is processed using the image filter) in real time or near real time. This allows users to more quickly see the preview of the filtered image and determine whether they should capture the filtered image or repositioned the receipt and/or the image capture device for a better viewpoint of the expense receipt. For example, a user may determine whether the filtered image (e.g., the image that simulates a black-and-white and/or a gray-scale photocopy) is legible enough by viewing the preview 155 instead of capturing an unfiltered image, processing the image using the image filter and then determining whether the filtered image is legible enough. The real-time preview 155 allows users to capture and/or store images of receipts more efficiently.

Figure 2:
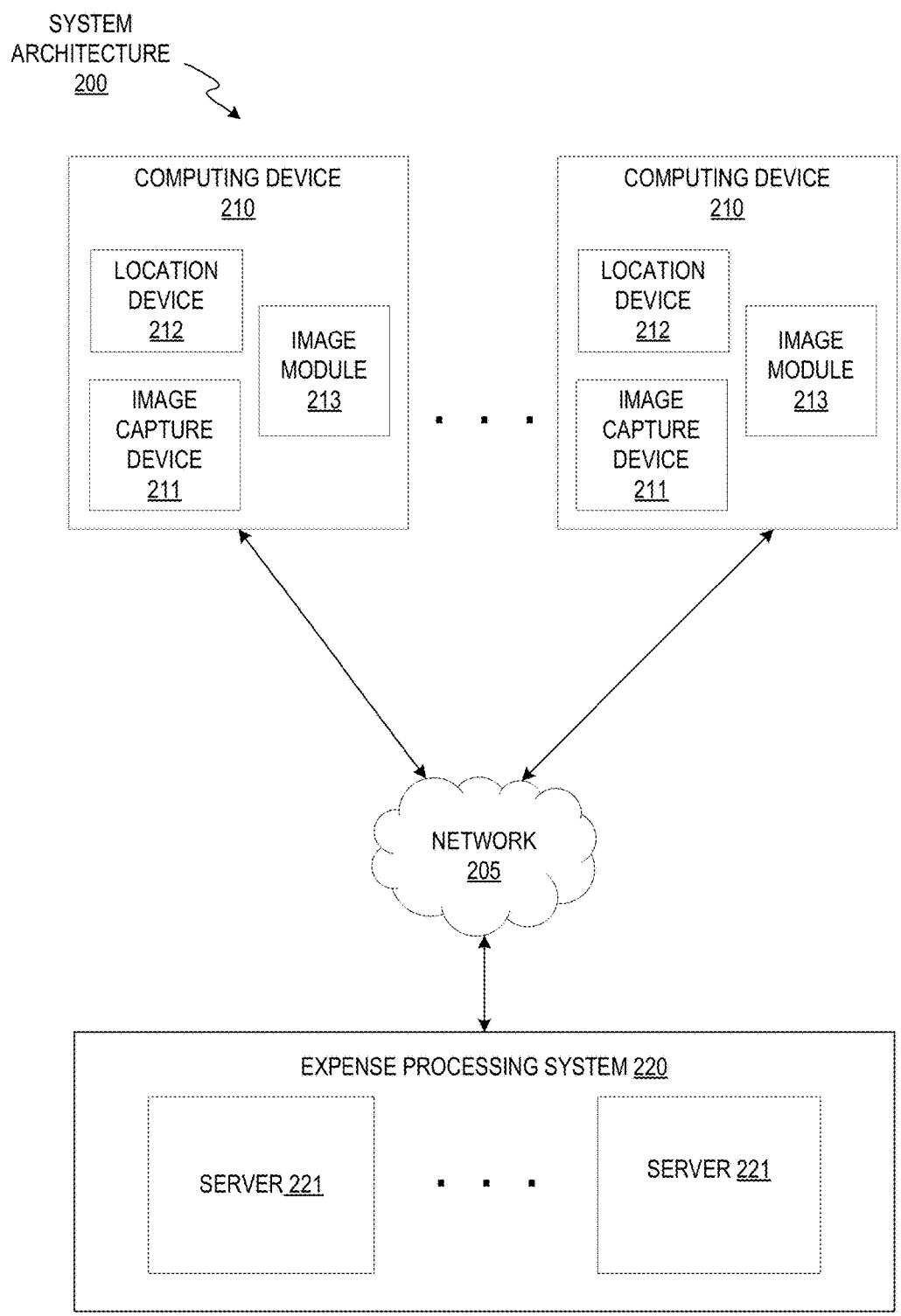
FIG. 2 illustrates an example system architecture in which embodiments of the present disclosure may operate.

FIG. 2 illustrates an example system architecture 200 in which embodiments of the present disclosure may operate. System architecture 200 includes computing devices 210 in communication with (e.g., coupled to) an expense processing system 220 over a network 205. The expense processing system 220 may include one or more servers (e.g., computing devices) 221. Each computing device 210 includes an image capture device 211, a location device 212, and an image module 213. In on embodiment, the network 205 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

The servers 221 may include computing devices that have a wide range of processing capabilities such a personal computer (PC), a server computer, a laptop computer, a netbook computer, a desktop computer, and/or any machine capable of executing a set of instructions (sequential or otherwise) that specify actions to be taken by that machine. The computing devices 210 represent various client devices that have a wide range of processing capabilities (e.g., a PC, a PDA, a smartphone, a laptop computer, a netbook computer, a tablet computer, a cellular phone, etc.).

Each computing device 210 includes an image capture device 211, a location device 212, and an image module 213. The image capture device 211 may be software and/or hardware which are capable of obtaining images of objects, such as an image of an expense receipt from a vendor. For example, the computing device 210 may be a smartphone and the image capture device 211 may be a digital camera and/or the software (e.g., drivers) for the digital camera. The image capture device 211 may include, but is not limited to, a digital camera, a camcorder, a video camera, a scanner, any device capable of capturing images, and/or software associated with such devices. The location device 212 may be software and/or hardware which are capable of obtaining the location of the computing device 210. For example, the location device 212 may be a Global Positioning System (GPS) device and/or the software for the GPS device. The location module may include, but is not limited to, a GPS device, an Assisted GPS (A-GPS) device, a Global Navigation Satellite System (GLONASS) device, a device capable of communicating with cellular communication towers to obtain location information for the cellular communication towers, and/or any device capable of obtaining the location of the computing device 210, and/or software (e.g., drivers or software modules/components) associated with such devices.

In one embodiment, the image module 213 may obtain image data associated with one or more expenses (e.g., an image of an expense receipt). The image module 213 may obtain the image data from the image capture device 211 (e.g., from a digital camera). In another embodiment, the image module 213 may also obtain contextual data (e.g., data associated with the location of the computing device 210, a time, a date, etc.). The contextual data may be associated with the image data. For example, the contextual data may indicate the geographical location at which the image data was obtained (e.g., GPS coordinates to indicate the location at which the image of an expense receipt was obtained). The image module 213 may transmit the image data and/or the contextual data to the expense processing system 220 via the network 205. The image module 213 may transmit the image data using a variety of communication protocols including, but not limited to HyperText Transfer Protocol (HTTP), HTTP Secure (HTTPS), email protocols (e.g., Post Office Protocol 3 (POP3) or Internet Message Access Protocol (IMAP), File Transfer Protocol (FTP), TCP/IP, UDP, 802.11 protocols, LTE protocols, and/or other electronic communication protocols.

In one embodiment, the image module 213 may present a GUI to the user to allow a user to capture images of expense receipts. For example, the image module 213 may present GUI 100 (as illustrated in FIG. 1A) and/or GUI 150 (as illustrated in FIG. 1B). The GUI may include a preview portion, as discussed above in conjunction with FIG. 1A and FIG. 1B. The image module 213 may also use an image filter to process the image data received from the image capture device 211. The image module 213 may generate filtered image data (e.g., a filtered image) using the image filter and the image data. The image filter may cause the filtered image to look like a photocopy of the expense receipt in the original image. In one embodiment, the image filter may be implemented as a software algorithm, function, and/or operation that processes the image, and/or as a hardware circuit or component (e.g., implemented in a graphics processing unit (GPU) as a shader that captures the image as a texture and adjusts the levels of light and darkness within an image). For example, the image filter may be included in a chipset (e.g., a circuit, such as an integrated circuit) for the image capture device 211, a graphics chipset, and/or a processing device (e.g., a central processing unit (CPU) for a computing device. In another example, the image filter may be implemented using graphics languages (e.g., a shading language such as the RenderMan Shading Language, the Houdini VEX Shading Language, the Gelato Shading Language, etc.) and/or application programming interfaces (APIs) such as Open GL and/or Direct X or other graphics languages. In another embodiment, the image filter may also generate data and/or other information obtained about the image of the expense receipt. For example, the image filter may also provide data about the brightness and/or focus of the image. The preview of the image may display one or more bars, numbers, images, and/or text to indicate the brightness of the image and/or whether the image is in focus. The preview may also present the user with an option to crop the image (e.g., change the borders of the image borders by defining corners or a mask).

The image module 213 may display one or more filtered images (e.g., filtered image data) in the preview portion of the GUI (as illustrated in FIG. 1B). The image module 213 may also display images received from the image capture device 211 without using the image filter (e.g., image data) in the preview portion of the GUI (as illustrated in FIG. 1A). The image module 213 may receive user input via the GUI to activate/deactivate the image filter, to capture an image and/or a filtered image of an expense receipt, and/or to cancel an image capture process (e.g., refrain from taking a photograph). In one embodiment, the image module 213 may display filtered images and unfiltered images simultaneously via the GUI (e.g., display the filtered images and unfiltered images side by side or overlaid on top of each other). For example, the image module 213 may use alpha blending (e.g., combining an image with a background image to create the appearance of partial or full transparency) to overlay a filtered image over an unfiltered image.

In another embodiment, the image module 213 may store one or more of an unfiltered image of the expense receipt (e.g., image data received from the image capture device 211 that is not processed using the image filter) and a filtered image of the expense receipt (e.g., filtered image data). For example, when the user activates a button (e.g., button 165 illustrated in FIG. 1B), the image module 213 may store the image of the expense receipt received from the image capture device and the filtered image of the expense receipt. In another example, when the user activates the button the image module 213 may store the filtered image and may not store the image of the expense receipt.

In one embodiment, the image module 213 may obtain contextual data associated with an image and/or a filtered image of an expense receipt. Contextual data may be data that is related to the image of the expense receipt. For example, contextual data may include, but is not limited to, date, location, currency, phone numbers, postal codes, lists of vendors, airport codes, area codes, phone numbers, postal codes, past receipts, state codes/names, country names, dates, month names, weekday names, frequently used terms, notes or data provided by a user (e.g., a brief description about the expense receipt, such as "Lunch on Monday") and/or anti-terms (e.g., terms which indicate that a portion of a receipt should not be analyzed or OCRed). For example, the image module 213 may determine contextual data, such as the location where an image and/or a filtered image was captured, using the location device 212. The image module 213 may transmit the contextual data and the associated image (e.g., image data) to the expense processing system 220. The image module 213 may transmit the contextual data and the associated image separately or may include the contextual data as part of the image data. The image module 213 may also store one or more images (image data), one or more filtered images (filtered image data), and contextual data on a data store coupled to the computing device 210.

In another embodiment, the image module 213 may apply multiple image filters to images (e.g., image data) received from the image capture device 211. For example, the image module 213 may use a first image filter (e.g., an image filter to simulate the look of a photocopy of a receipt) and a second image filter (e.g., a filter that applies edge detection to detect the edges of characters and/or text). In another example, the image module 213 may use one or more additional image filters that apply a threshold color to remove backgrounds, perform noise filtering on an image or a filtered image, crop and image, and/or perform other transformations and/or processing on images and/or filtered images, perform color correction, correct a perspective of the image, despeckle an image (e.g., smoothing areas of an image or of removing speckles (extra pixels) from the image), blur colors in an image, sharpen an image, transform a portion of the image of the expense receipt to fill the entire image, etc. The one or more additional image filters may be applied in real-time (or near real-time) to the images received from the image capture device 211. For example, referring to FIG. 1B, the preview 155 may display real-time images of the expense receipt in that are filtered by a first image filter to simulate a photocopy of a receipt and a second image filter to sharpen the educes of text in the image of the receipt. In one embodiment, the image module 213 may apply the one or more image filters to pre-existing images (e.g., images that are already in the data store) to generate filtered images (e.g., filtered image data).

In one embodiment, the image module 213 may determine the size of a receipt. For example, the image module 213 may determine that an expense receipt is a hotel bill and that hotel bills are most likely the size of a standard piece of paper (e.g., 8.5 inches by 11 inches). In another example, the image module 213 may use multiple image capture devices (e.g., two digital cameras) within a computing device 210 (not shown in the figures) to determine a distance between the computing device 210 and the expense receipt. In a further example, the image module 213 may use other sensors, devices, and/or components (e.g., an infrared sensor, a laser, etc.) in the computing device 210 to determine the distance between the computing device and the expense receipt. Based on the distance, the image module 213 may determine the size of the receipt. The image module 213 may store the image of the receipt at different resolutions, based on the size of the expense receipt. For example, a full page receipt (e.g., a hotel bill) may be stored using a higher resolution (e.g., more pixels) than a smaller receipt (e.g., a receipt from a coffee shop or restaurant). This may allow the image of the receipt and/or filtered image of the receipt to appear as if the receipt was actually copied using a copy machine or a scanner. In another embodiment, the image module 213 may also determine the orientation of the expense receipt. For example, the image module 213 may determine that the image of the expense receipt should be rotated clockwise in order for the text to appear upright when the image of the expense receipt is viewed in the GUI.

In one embodiment, the expense processing system 220 may process the image data and/or the contextual data received from the computing device 210. The expense processing system 220 may process receipts and/or image data for expenses such as phone bills, hotel bills, airline tickets, taxi receipts, restaurant bills, dry cleaning bills, or any expense for products and/or services. The contextual data may also include notes related to the expenses (e.g., a note indicating how many miles on a taxi ride were work related). Based on the image data and/or the contextual data, the expense processing system 220 may generate one or more expense reports (e.g., a list of expenses) and/or one or more expense feeds (e.g., a list of the expenses which may be provided to other systems). In another embodiment, the expense processing system 220 may apply additional filters to an image (e.g., image data and/or filtered image data) received from the computing device 210. The expense processing system may also determine the size of the receipt based on the type and/or category of the receipt and/or the contextual data.

In one embodiment, an expense (listed in a report or provided in an expense feed) can include a description of the expense, notes or comments associated with the expense, a category code, an amount, a tax code, a tax percentage (e.g., an 8.25% tax rate), a tax amount, an amount in a local currency, the city, the state, the country, the longitude, the latitude or other form of the location of the expense, the vendor for the expense, exchange rate associated with the expense, the amount in a home currency, the amount in the local currency, the type of currency, people or guests that participated in the expense (e.g. customers hosted), the type of expense (e.g. meal or transportation), or any combination of the above. In some embodiments, an expense can include several line items including but not limited to different items on grocery bill, items of a hotel bill such as for example room rate, entertainment, meals, parking, phone, internet or taxes. This is sometimes stored in the description of the expense but not exclusively.

In one embodiment, an expense report may also include additional information such as an employee name, a division the employee belongs to, a region, a name or email of the manager of the employee, a company name, a project code, a customer code, a cost center, or similar indicators, a home currency, a purpose of a trip or expense, destinations, start time/date, end time/date. In another embodiment, the expense report may also include images of the receipts for the associated expenses. The expense report may include an identification tag to reference an expense back to the image of the expense receipt.

In one embodiment, the expense processing system 220 may generate a feed of expenses (e.g., data associated with the expenses or an expense feed) which may be provided and/or imported into other reporting systems (e.g., other types of expense processing systems). In some embodiments, processing of expense receipts, generation of expense reports, and/or generation of expense feeds are performed automatically (e.g., without user interaction). Although the system architecture 200 includes multiple entities such as one or more computing device 210 and servers 221, other embodiments of the invention may use different system architectures. For example, the functionality discussed herein may be completely implemented on a computing device 210 or a server 221 in a client-server environment. In other examples, the functionality discussed herein may be implemented on one or more nodes in a peer-to-peer environment (e.g., the expense processing system 220 includes one or more nodes), a cloud computing environment (e.g., the expense processing system 220 is located within a "cloud"), a grid computing environment (e.g., the expense processing system 220 is located within a distributed computing device), etc.

In one embodiment, an expense feed may include a continuous series of expense data that can be electronically submitted to other systems for further processing. For example, an expense feed may include one or more expenses obtained based on image data, which may be converted to a format which is usable by another expense processing system (e.g., an existing or commercially available expense processing system), posted via an API or other interface to another system (which may be in the same location as the expense processing system or in a remote location, such as within the cloud or Internet), and/or downloaded from a central location by another system.

Figure 3:
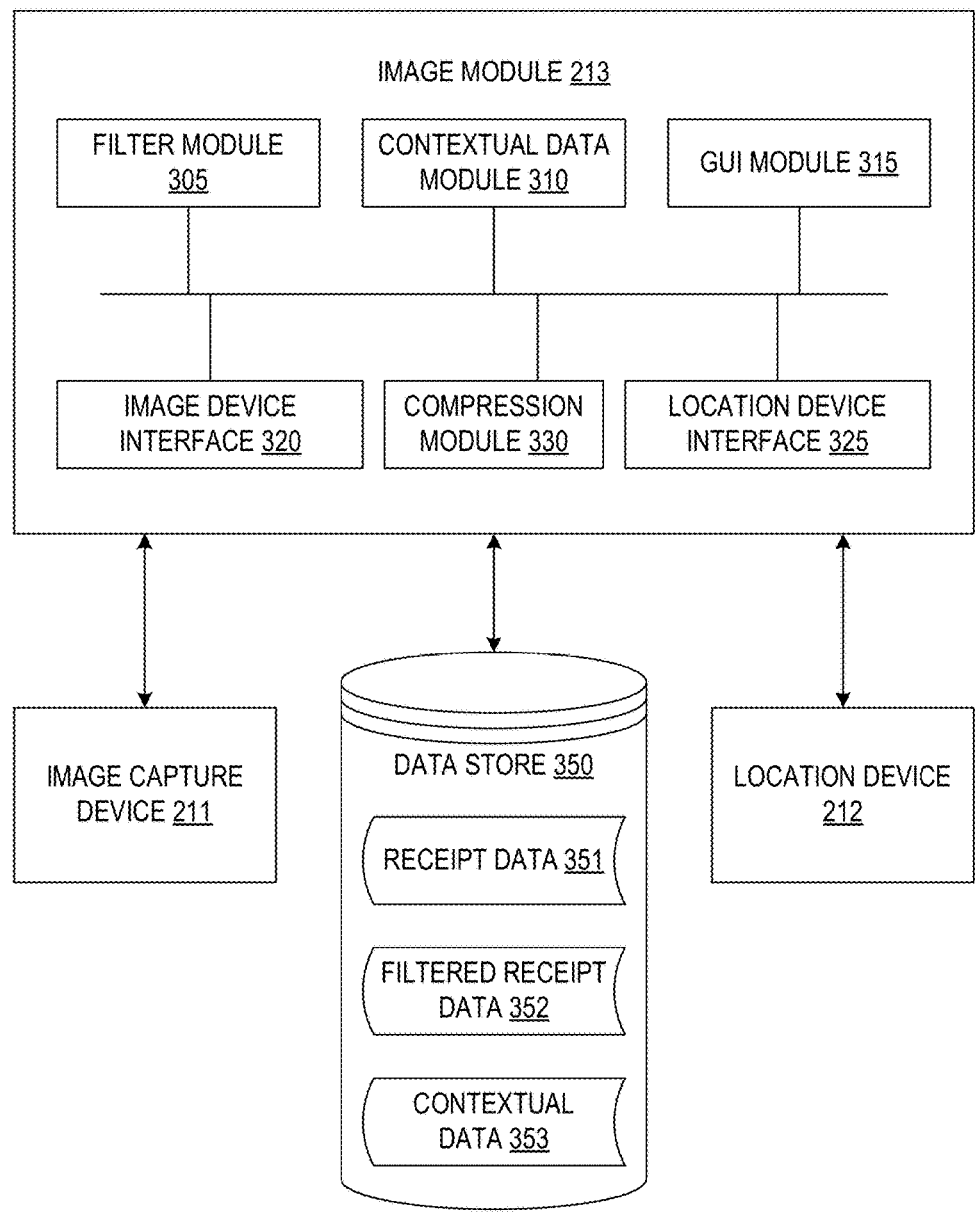
FIG. 3 is a block diagram illustrating an image module, according to one embodiment.

FIG. 3 is a block diagram illustrating an image module 213, according to one embodiment. The image module 213 includes a filter module 305, a contextual data module 310, a GUI module 315, an image device interface 320, and a location device interface 325, and a compression module 330. More or less components may be included in the image module 213 without loss of generality. For example, two of the modules may be combined into a single module, or one of the modules may be divided into two or more modules. In one embodiment, one or more of the modules may reside on different computing devices (e.g., different server, desktop, or laptop computers).

The image module 213 is coupled to an image capture device 211, a location device 212, and a data store 350. As discussed above, the image capture device 211 may include a digital camera, a video camera, any device capable of capturing images of expense receipts, and/or any software associated with such devices. Also as discussed above, the location device 212 may include a GPS device, an A-GPS device a GLONASS device, a device capable of communicating with cellular communication towers (e.g., cell towers, base stations, NodeBs) to obtain location information for the cellular communication towers, and/or any device capable of obtaining the location of a computing device, and/or software (e.g., drivers or software modules/components) associated with such devices. The data store 350 may be a memory (e.g., random access memory), a cache, a drive (e.g., a hard drive), a flash drive, flash memory, a database system, and/or another type of component or device capable of storing data. The data store 350 may also include multiple storage components (e.g., multiple drives or multiple databases). The data store 350 includes image data 351, filtered image data 352, and contextual data 353.

In one embodiment, the image data 351 may include one or more images of expenses receipts captured and/or generated by the image capture device 211. The images in the image data 351 may not be processed using an image filter. For example, the images in the image data 351 may be images that are received by the image module 213 directly from the image capture device 211 and stored in the data store 350 without applying an image filter. The filtered image data 352 may include one or more images of expenses receipts after the images have been processed using an image filter. In another embodiment, the images in the filtered image data 352 may be images that are processed using an image filter (e.g., an image filter that simulates a photocopy of an expense receipt). For example, the images in the image data 351 may be images that are received by the image module 213 from the image capture device 211 and that have been processed by the filter module 305. In one embodiment, the contextual data 353 may include contextual data (e.g., timestamp image was captured, location image was captured, notes associated with an image received from a user, etc.) that is associated with one or more images in the image data 351 and/or the filtered image data 352.

In one embodiment, the image device interface 320 may communicate data (e.g., images or image data) with the image capture device 211. The image device interface 320 may receive images that are captured by the image capture device 211. The image module 213 may provide one or more of the images to a preview portion of a graphical user interface (as illustrated in FIGS. 1A and 1B) and/or to other modules (e.g., filter module 305). In another embodiment, the location device interface 325 may communicate data (e.g., GPS coordinates, city, state, street address, longitude/latitude coordinates, and/or other data indicating the location of a computing device) with the location device 212. For example, the location device interface 325 may receive GPS coordinates from the location device 212 (e.g., a GPS device or sensor) and may compute and/or determine a location of the computing device based on the GPS coordinates.

In one embodiment, the filter module 305 may apply an image filter on images received from the image capture device 211. For example, as discussed above in conjunction with FIG. 1B, the filter module 305 may be applied to an image (e.g., image data) to generate a filtered image (e.g., filtered image data). The filtered image may be an image of an expense receipt that may look like and/or may simulate a photocopy of the expense receipt, as illustrated by image 156 in FIG. 1B. The image filters used by the filter module 305 may be a software algorithm, function, and/or operation that processes images and/or as a hardware circuit or component (e.g., implemented in a graphics processing unit (GPU) as a shader). The filter module 305 may also apply additional filters (e.g., filters to sharpen the edges of text, to perform color correction, to crop the image, etc.) on the images received from the image capture device 211. The filter module 305 may apply the one or more filters in real time (e.g., may process images using the one or more filters as the images are received from the image capture device 211) or near real-time. This may allow the GUI module 315 to present a GUI with a preview portion that displays the filtered images in real-time or in near real-time.

In one embodiment, the filter module 305 may also process images that are stored in the image data 351 (e.g., images that were previously stored in the data store 350).

For example, the filter module 305 may apply one or more image filters to an image of an expense receipt that a user captured a day ago. In another embodiment, the filter module 305 may also process images to determine the sizes of expense receipts. For example, the filter module 305 may analyze two images received from two different image capture devices in a computing device (not shown in the figures) to determine a distance between the computing device and the receipt and may determine the size of the receipt based on the distance.

In one embodiment, once a user indicates that the user wants to take a photograph of an expense receipt, the filter module 305 may receive the image (e.g., photograph) from the image capture device 211 and may apply one or more image filters to the image. In one embodiment, the image filtered applied to the image (e.g., the photograph) taken by the user may be the same image filter use to provide a preview of the expense receipt. In another embodiment, different image filters may be applied to the image (e.g., photograph) taken by the user). For example, a different image filter that emphasizes edges of text differently may be used because the image taken by the user may have a higher resolution of the than the images used in the preview.

In one embodiment, the filter module 305 may store images in a variety of image formats. For example, the filter module 305 may store images in a Joint Picture Experts Group (JPEG) format, a bitmap (BMP) format, a graphics interchange format (GIF), a Portable Network Graphics (PNG) format, a run-length encoded file and/or any combination of image formats. In one embodiment, because the filter module 305 stores images as black-and-white and/or gray-scale images, the filter module 305 may reduce the amount of storage spaced used to store the images. For example, instead of storing every pixel of an image in full color, the amount of data may be reduced for 1-bit per pixel (black and white), while maintaining a clear and legible receipt image. In another example, a gray scale image with shades of gray may also be stored instead of a full color Red Green Blue (RGB) image or a Red Green Blue Alpha (RGBA) image received from the image capture device 211.

In one embodiment, the contextual data module 310 may obtain and/or generate contextual data 353 for one or more images (e.g., for an image and/or a filtered image). For example, the contextual data module 310 may determine the time and date (e.g., contextual data) that an image and/or a filtered image was captured. In another example, the contextual data module 310 may determine the geographical location where an image and/or a filtered image was captured. In a further example, the contextual data module 310 may receive a note, data, and/or other information from a user (e.g., via a GUI) and may associate the note, data, and/or other information (e.g., a note indicating that a receipt is for a snack while travelling at the airport) with an image and/or filtered image. The contextual data module may store the contextual data 353 in the data store 350 separately from the image data 351 and the filtered image data 351. The contextual data module 310 may also store data indicating which image and/or filtered image that the contextual data is associated with. The contextual data module 310 may also include the contextual data as part of image data 351 and/or filtered image data 352. For example, the contextual data module 310 may include the contextual data in the metadata of an image.

In one embodiment, the compression module 330 may compress images (e.g., image data), filtered images (e.g., filtered image data), and/or contextual data. For example, the compression module 330 may compress one or more of the images, the filtered images, and/or the contextual data using a ZIP compression algorithm, a Lempel-Ziv-Welch (LZW) compression algorithm, and/or various other compression algorithms and/or functions. The compression module 330 may further reduce the size of the images ands/or contextual data that may be transmitted by the image module 213 to an expense reporting system and may further reduce the amount of bandwidth used by a computing device.

In one embodiment, the GUI module 315 may provide a GUI that presents a real-time preview of an expense receipt (e.g., as illustrated in preview 105 of FIG. 1A and preview 155 of FIG. 1B) before capturing an image (e.g., taking a photograph or a color image) of the expense receipt. The preview may function as a viewfinder for the image capture device 211 and may allow a user to view images from the viewpoint of the image capture device 211 in real time. The preview may display images that may be directly received from the image capture device 211 (e.g., without applying an image filter as illustrated in FIG. 1A) and/or may display filtered images that have been processed by filter module 305 (as illustrated in FIG. 1B). The GUI module 315 may present multiple previews in the GUI or may overlay a filtered image over another image in the preview. The GUI module 315 may also provide various buttons in the GUI to allow a user to capture an image, activate/deactivate image filters, and/or cancel an image capture process (e.g., refrain from taking photograph).

Figure 4:
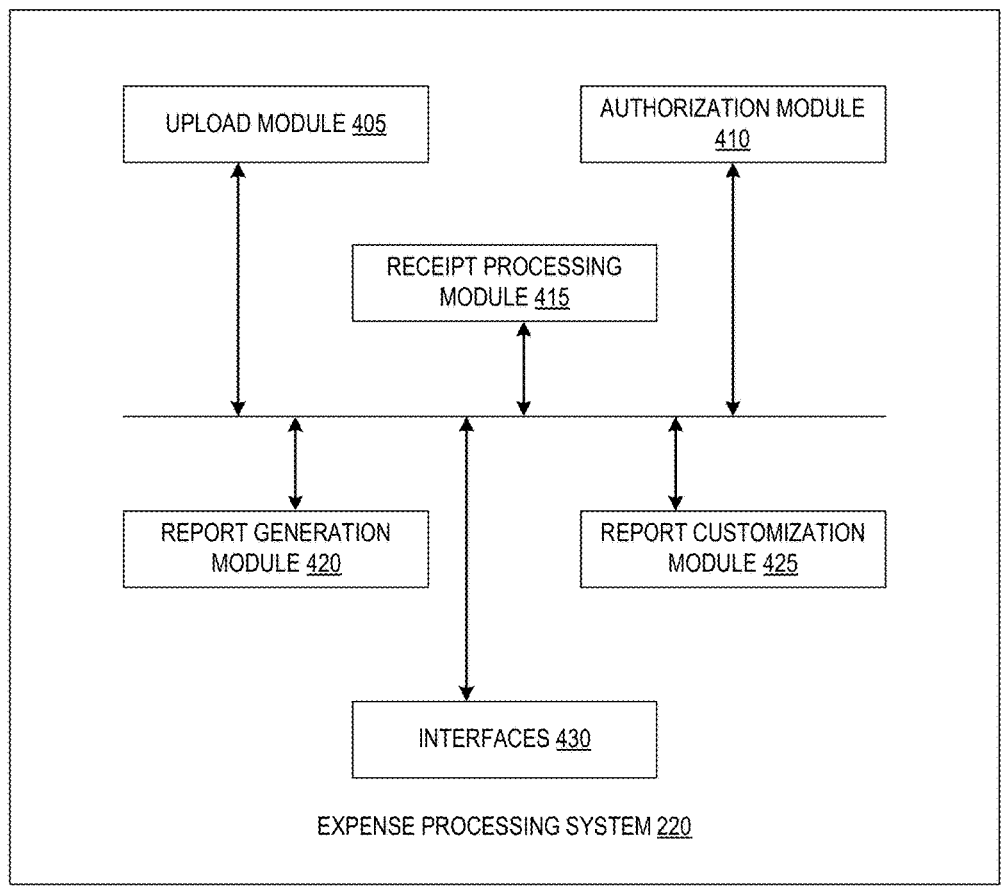
FIG. 4 is a block diagram illustrating an expense processing system, according to one embodiment.

FIG. 4 is a block diagram illustrating an expense processing system 220, according to one embodiment. The expense processing system 220 may include an upload module 405, an authorization module 410, a receipt processing module 415, a report generation module 420, a report customization module 425, and one or more interfaces 430. In one embodiment, the modules of the expense processing system 220 may be located on one or more of the servers 221 shown in FIG. 2. More or less components may be included in the expense processing system 220 without loss of generality.

As discussed above, an image module (e.g., image module 213) allows a user to collect image data (e.g., images and/or data associated with expense receipts for food, lodging, transportation, etc.) and submit the receipt for processing to the expense processing system 220. The user may also submit contextual data associated with the expense receipts (e.g., date, time, location, currency, phone numbers, postal codes, airport codes, notes, etc.). The submission may be performed using the same device (e.g., a smartphone, a netbook, etc.) used for taking the images or may be performed using a different device (e.g., a personal computer). The image data (e.g., images of the expense receipts) and the contextual data associated with the image data may be referred to as expense data. In one embodiment, the expense data may include image data and contextual data for multiple expense receipts. The expense processing system 220 may receive expense data from one or more computing devices and may generate one or more expense reports and/or expense feeds, based on the expense data.

The authorization module 410 may authorize a user of the expense processing system 220. The authorization module 410 may help prevent unauthorized users from submitting expense receipts for processing and/or generating expense reports. A user may be authorized using a variety of different methods and/or data. For example, the user may provide a user name, password, and/or email address. In another example, the user may provide an authentication ticket (e.g., a Single Sign On ticket). In yet another example, the user may authenticated by analyzing identification information of the computing system used by the user (e.g., a phone number for a smartphone or an International Mobile Equipment Identity (IMEI) number for a smartphone). In one embodiment, different combinations of data and/or methods may be used. For example, the email address of the user and the IMEI of a computing device may be used to authenticate the user.

The upload module 405 may process and/or manage the expense receipts (e.g., expense data) received from one or more computing systems. The upload module 405 may receive expense data from computing systems using protocols such as HTTP, HTTPS, SSL, or FTP. In one embodiment, the expense data may include one or more of: 1) receipt images, 2) receipt-related context information, 3) report-related context information, 4) user-related context information, and 5) delivery-related context information.

In one embodiment, the receipt images may be in an image format such as a Joint Picture Experts Group (JPEG) format, a bitmap (BMP) format, a graphics interchange format (GIF), a Portable Network Graphics (PNG) format, etc. In another embodiment, the contextual information (e.g., the receipt-related context information, report-related context information, user-related context information, and delivery-related context information), which may be provided per receipt image, may include information that is not part of the receipt itself such as the longitude, latitude and country where the receipt image was created (e.g., geographical location where the picture was taken), additional notes from the user (e.g., a note describing the purpose of the expense), an indicator as to whether this is an out-of-pocket charge (i.e. paid by the user), etc.

In a further embodiment, the report-related context (which may be provided per receipt image) may include information such as the home currency of the user, the format for the expense report, etc. The upload module 405 may provide the expense data (e.g., image data such as an image of the receipt, and the contextual data for the receipts) to the receipt processing module 415 for further processing. Examples of receipt-related context information include, but are not limited to the time when an image of a receipt was obtained, an identification of a cellular communication tower in communication with the computing system when the image of the receipt was obtained, additional notes, sensor information captured before, after or when the image of the receipt was obtained (e.g., temperature, altitude, etc.). Examples of report-related context information include, but are not limited to, an activity, client, home currency to which all other currencies of the report get converted, project, matter code, cost center, customer description, name, identifier and/or number that is associated with one or more expenses in an expense report. Examples of user-related context information include, but are not limited to, the preferred device language, region, time format, first name, last name, company name, title, manager, manager's email, banking information, address information, location of employment, employee organizational unit, company name, etc. For example the first name and/or last name of the user submitting the receipt may be ignored when analyzing the text within the receipt and determining the location or vendor in a particular receipt, because the user's name is mostly likely not the vendor's name or location. Examples of delivery-related context information include, but are not limited to, any expense report format settings, the selection of the individual files in the delivery, potential fees required to add on top of line items for all reports, any information about a third-party system where the results will be posted to.

The receipt processing module 415 may perform a variety of operations on the expense data received from the upload module 405. In one embodiment, the receipt processing module 415 may optionally perform image processing operations to enhance the quality of the images of the receipt. In another embodiment, the receipt processing module 415 may also perform Object Character Recognition (OCR) on the text within the receipt, in order to obtain receipt information to use in an expense report and/or an expense feed. For example, the receipt processing module 415 may identify the amount, business name, the item purchased, the service rendered, the city, the state, and/or the country of the expense buy analyzing the text of the receipt (e.g., may identify the receipt information in the receipt). The receipt processing module 415 may also identify to Value-added tax (VAT) amount on the receipt with or without the help of a country-based VAT database that includes rules for the different VAT rates for different countries.

In one embodiment, the receipt processing module 415 may use grammars and algorithms to interpret the image data (e.g., the OCR text from the image of the receipt) in conjunction with the contextual data associated with the image data. For example, a Zone Improvement Plan (ZIP) code or postal code on the receipt can identify the city, state, and country of the expense. In another example, the area code or full phone number may also be used to identify city, state and country of the expense. The full phone number may also be used to determine the name of the vendor and possibly the type of expense. The name of cities, state codes or state names can also be used to identify the location of the expense and/or vendor. Airport codes or airport names can also assist in identifying the location of the expense and/or vendor. In a further example, the contextual data (e.g., the location where the image of the receipt was taken) may also be used to determine the location of the expense. Based on the data of the receipt (e.g., the text of the receipt with a restaurant name) and the contextual data (e.g., the location where the receipt image was obtained), the receipt processing module 415 may query one or more databases to obtain information about the business which provided the goods and/or services associated with the receipt. In another example, the time identified in the image data may be used to determine whether the meal expense on the receipt is lunch, dinner or breakfast.

In one embodiment, the interpreted image data (e.g., receipt information obtained by performing OCR on a receipt) may override the contextual data associated with the receipt. For example, an expense receipt may be from a dinner at a restaurant. A user may take a picture of the receipt back at a hotel room. The contextual data (e.g., the location where the image of the receipt was taken) would contain the geographic location of the hotel room. However, the text of the receipt may include the address of the restaurant. The address of the restaurant obtained from the receipt may override the contextual data which includes the location where the image of the receipt was taken (e.g., the hotel room). In another example, a date in the receipt can override the date when the image of the receipt was taken (e.g., the contextual data associated with the receipt).

In one embodiment, the receipt processing module 415 may optionally allow a human operator to correct and/or add information associated with one or more expense receipts and may also allow the human operator to release the expense receipts for further processing. It should be understood that in some embodiments, the receipt processing module 415 may operate without the interaction of a human operator.

In one embodiment, the receipt processing module 415 may estimate the size of an expense receipt. For example, the receipt processing module 415 may determine the type and/or category of the receipt (e.g., restaurant receipt, hotel bill, cell phone bill, etc.) and may determine the size of the expense receipt based on the type and/or category of the expense receipt. In another embodiment, the receipt processing module 415 may also apply additional image filters (e.g., a filter to correct the color of an image, a filter to despeckle and image, etc.) to images received from computing devices (e.g., computing device 210). In a further embodiment, the receipt processing module 415 may apply one or more filters to existing receipts that may be stored in a data store coupled to the expense processing system 220 (e.g., may be stored in a database coupled to the expense processing system).

The report generation module 420 uses the expense data (e.g., the image data and the contextual data) and the report-related context information to generate the report. For example, the report generation module 420 may convert all receipt amounts to a pre-defined currency (e.g., convert Euros to U.S. Dollars) or may assign different expense receipts to different projects. After generating the report the report generation module 420 may provide the report to the report customization module 425.

The report customization module 425 may allow for customization (e.g., selection of what type of data is presented and how the data is presented) of expense reports. The expense report may be customized based on a report template. For example, an entry in a report (e.g., an entry for a particular expense) may have a separate column for the tax and a separate column for the pre-tax amount, or the total amount may be combined into one column, based on the report template. The report template can be configured using the one or more interfaces 430.

One or more interfaces 430 may be used to configure, manage, maintain, and/or access the expense processing system 220. For example, the interface 430 may be used by a human operator to check an expense report before submitting the expense report for approval. The interfaces 430 may include GUIs, web pages, windows, buttons, text fields, slider bars, menus, and/or other GUI elements.

Figure 5:
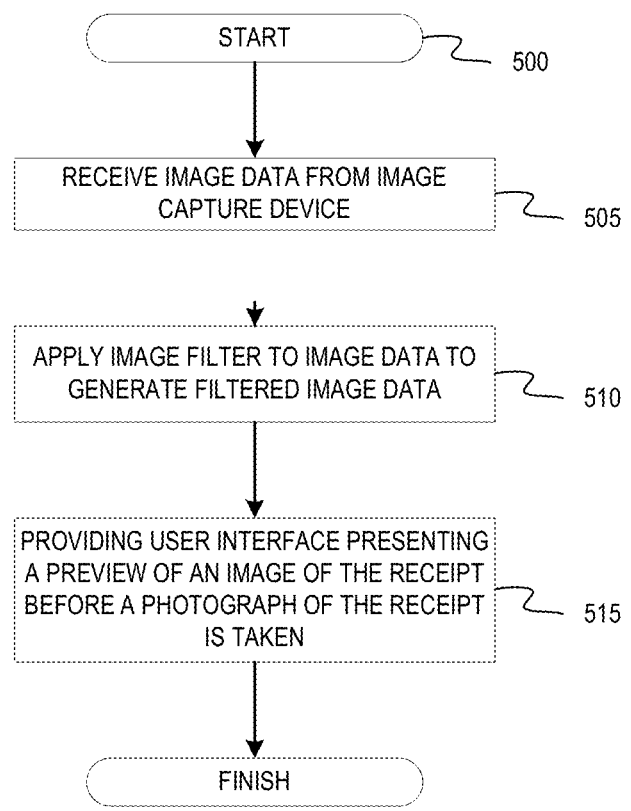
FIG. 5 is a flow diagram illustrating a method of processing images of receipts, according to one embodiment.
Figure 6:
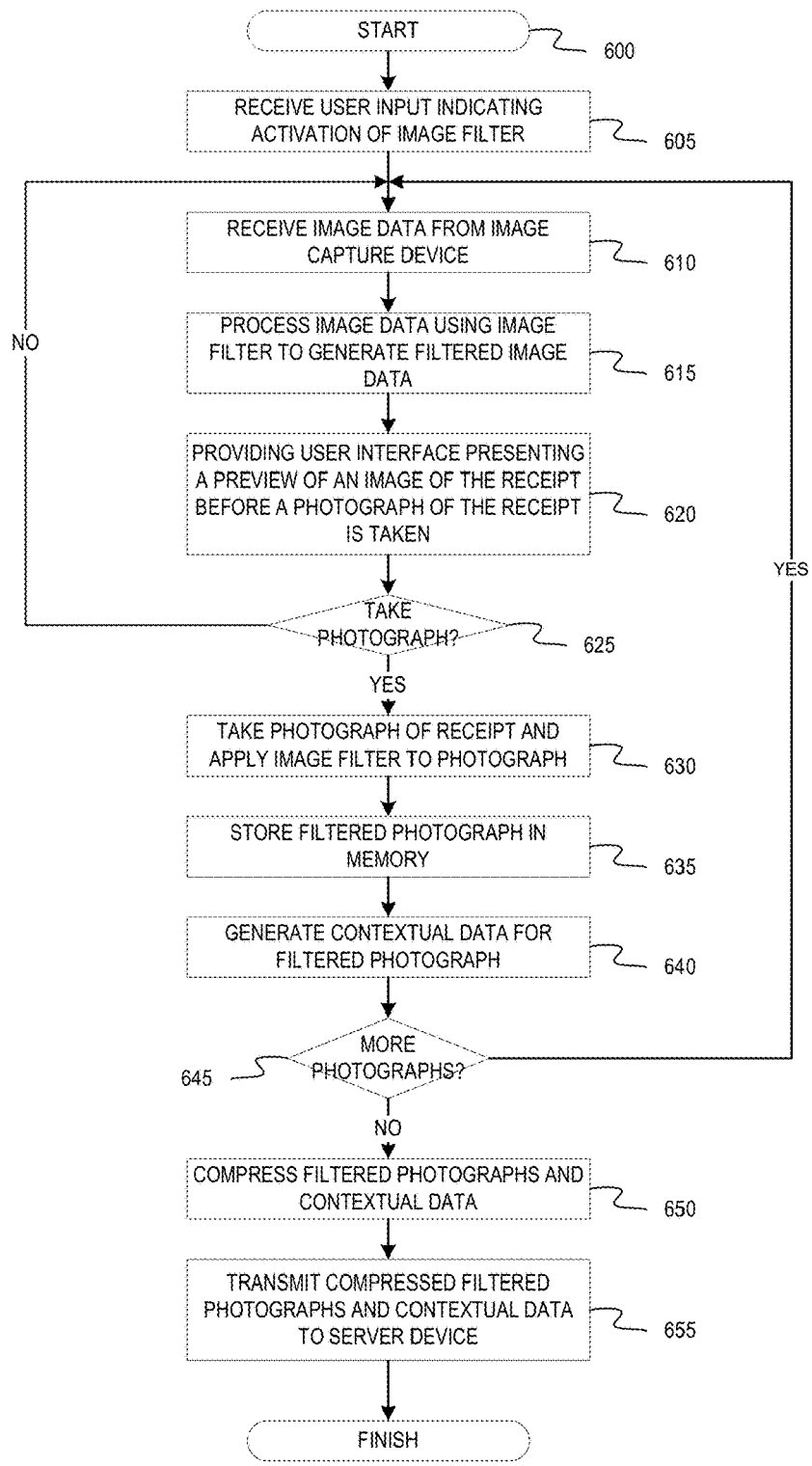
FIG. 6 is a flow diagram illustrating a method of processing images of receipts, according to another embodiment.

FIGS. 5 and 6 are flow diagrams illustrating methods of processing images of receipts. For simplicity of explanation, the methods are depicted and described as a series of acts. However, acts in accordance with this disclosure can occur in various orders and/or concurrently and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 5 is a flow diagram illustrating a method 500 of processing images of receipts, according to one embodiment. The method 500 may be performed by processing logic that comprises hardware (e.g., circuitry, dedicated logic, programmable logic, microcode, etc.), software (e.g., instructions run on a processor to perform hardware simulation), or a combination thereof. In one embodiment, method 500 may be performed by an image module, as illustrated in FIGS. 2 and 3.

Referring to FIG. 5 the method 500 begins at block 505 where the method 500 receives image data (e.g., one or more images of an expense receipt) from an image capture device (e.g., from a digital camera). At block 510, the method 500 applies an image filter to the image data to generate filtered image data. For example, the method 500 may apply an image filter that generates filtered image data (e.g., a filtered image) that simulates and/or emulates (e.g., looks like) a photocopy of the expense receipt. At block 515, the method 500 provides a user interface (e.g., a GUI) to a user. The user interface presents a real-time preview of the expense receipt before a photograph of the expense receipt is taken. For example, the user interface may function as viewfinder or the image capture device and the images displayed in the preview may be filtered images (e.g., may be images received from the image capture device that have been processed using the image filter). In one embodiment, the real-time preview of the expense receipt may simulate and/or emulate a photocopy of the expense receipt. After block 515, the method 500 ends.

FIG. 6 is a flow diagram illustrating a method of processing images of receipts, according to another embodiment The method 600 may be performed by processing logic that comprises hardware (e.g., circuitry, dedicated logic, programmable logic, microcode, etc.), software (e.g., instructions run on a processor to perform hardware simulation), or a combination thereof. In one embodiment, method 600 may be performed by an image module, as illustrated in FIGS. 2 and 3.

Referring to FIG. 6 the method 600 begins at block 605 where the method 600 receives user input indicating activation of an image filter (e.g., an image filter that generates filtered images that simulate a photocopy of an expense receipt). At block 610, the method 600 receives image data (e.g., images) from an image capture device (e.g., a digital camera, a video camera, etc.). The method 600 processes the image data using the image filter to generated filtered image data (e.g., filtered images). For example, the method 600 may generate the image 156 illustrated in FIG. 1B. The method provides a user interface (e.g., a GUI) and the user interface presents a preview (e.g., preview 155 illustrated in FIG. 1B) of the receipt before a photograph of the receipt is taken (block 620). At block 625, the method 600 determines whether a photograph should be taken. For example, the method 600 may determine whether button 165 (illustrated in FIG. 1B) has been pressed, clicked, and/or activated by a user. If no photograph should be taken (e.g., if a user refrains from taking a photograph), the method 600 proceeds back to block 610.

If a photograph should be taken, the method 600 proceeds to block 630, where the method 600 takes a photograph of the receipt and applies the image filter to the photograph to obtain a filtered photograph. At block 625, the method 600 stores the filtered photograph in memory. The method generates contextual data (e.g., location where photograph was taken, time/date the photograph was taken, notes received from a user, etc.) at block 640. The method 600 may also associate the contextual data with the filtered photograph. At block 645, the method 600 determines whether a user wishes to take more photographs. For example, the method 600 may determine whether a user has provided user input indicating that the user is done taking photographs and that the photographs should be uploaded to a server device (e.g., to an expense processing system). If the user wants to take more photographs, the method 600-proceeds back to block 610. If the user does not want to take more photographs, the method proceeds to block 650 where the method 600 compresses the filtered photographs and the contextual data associated with the filtered photographs. At block 655, the method 600 transmits the compressed filtered images and the compressed contextual data to the server device. After block 655, the method 600 ends.

Figure 7:
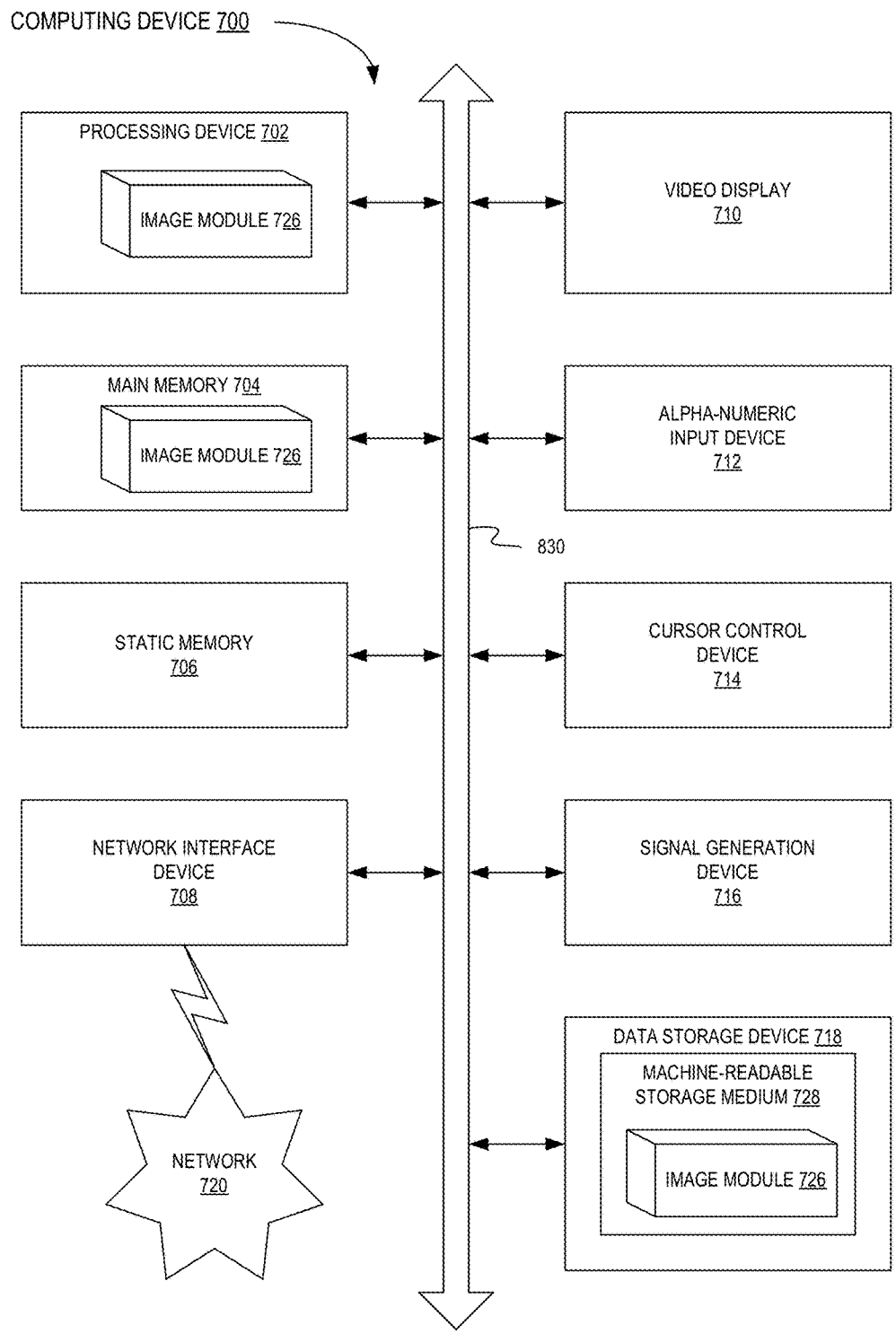
FIG. 7 illustrates a diagrammatic representation of a machine in the example form of a computer system, in accordance with one embodiment.

FIG. 7 illustrates a diagrammatic representation of a machine in the example form of a computing device 700 within which a set of instructions, for causing the machine to perform any one or more of the methodologies discussed herein, may be executed. The computing device 700 may be in the form of a computing system, such as a smartphone, a cellular phone, a tablet computer, a netbook computer, a server computers, a desktop computer, a laptop computer, etc., within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 700 includes a processing device (e.g., a processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)) and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute image module 726 for performing the operations and steps discussed herein.

The computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and a signal generation device 716 (e.g., a speaker). In one embodiment, the video display unit 710, the alphanumeric input device 712, and the cursor control device 714 may be combined into a single component or device (e.g., an LCD touch screen).

The data storage device 718 may include a computer-readable medium 728 on which is stored one or more sets of instructions (e.g., image module 726) embodying any one or more of the methodologies or functions described herein. The image module 726 may also reside, completely or at least partially, within the main memory 704 and/or within the processing device 702 during execution thereof by the computing device 700, the main memory 704 and the processing device 702 also constituting computer-readable media. The instructions may further be transmitted or received over a network 720 via the network interface device 708.

While the computer-readable storage medium 728 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "processing," "providing," "allowing," "taking," "applying," "storing," "generating," "transmitting," "compressing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving, by a processing device, user input indicating an activation of an image filter;
   receiving, by the processing device, image data for a receipt and contextual data for the receipt, wherein the image data is from an image capture device and the contextual data comprises data of a past receipt;
   calculating, by the processing device, a distance to the receipt in view of one or more sensor devices of the image capture device;
   determining, by the processing device, a size of the receipt in view of the distance to the receipt and the contextual data comprising the data of the past receipt;
   processing, by the processing device, the image data in view of the image filter and the determined size of the receipt to obtain filtered image data;
   determining, by the processing device, a resolution for storing the filtered image data based on the determined size of the receipt;
   providing, by the processing device, a user interface presenting a preview of the filtered image data in real time; and
   storing, by the processing device, the filtered image data using the determined resolution.

2. The method of claim 1, further comprising:
   receiving a second user input indicating a user request to take a photograph of the receipt;
   taking the photograph of the receipt;
   applying the image filter to the photograph of the receipt to obtain a filtered photograph of the receipt; and
   storing the filtered photograph of the receipt in a memory.

3. The method of claim 2, wherein the filtered photograph of the receipt is smaller in size than the photograph of the receipt.

4. The method of claim 2, further comprising:
   generating additional contextual data associated with one or more of the photograph of the receipt or the filtered photograph of the receipt; and
   transmitting one or more of the photograph of the receipt, the filtered photograph of the receipt, or the additional contextual data to a server device.

5. The method of claim 4, further comprising compressing one or more of the photograph of the receipt, the filtered photograph of the receipt, or the additional contextual data.

6. The method of claim 2, further comprising storing the photograph of the receipt in the memory.

7. The method of claim 2, wherein the filtered image data and the filtered photograph of the receipt emulate one or more of a black-and-white photocopy of the receipt or a grayscale photocopy of the receipt.

8. The method of claim 1, further comprising:
   receiving second user input indicating a deactivation of the image filter; and
   providing the user interface presenting a second preview of a second image of the receipt before the photograph of the receipt is taken, wherein the second preview is based on the image data.

9. The method of claim 1, wherein the user interface presents a second preview of the receipt simultaneously with the preview of the filtered image data, wherein the preview and the second preview are based on the image data and are presented before a photograph of the receipt is taken.

10. An apparatus comprising:
    a memory to store a plurality of images;
    a processing device coupled to the memory, the processing device to:
    receive user input indicating an activation of an image filter;

receive image data for a receipt and contextual data for the receipt, wherein the image data is from an image capture device and the contextual data comprises data of a past receipt;

calculate a distance to the receipt in view of one or more sensor devices of the image capture device;

determine a size of the receipt in view of the distance to the receipt and the contextual data comprising the data of the past receipt;

process the image data in view of the image filter and the determined size of the receipt to obtain filtered image data;

determine a resolution for storing the filtered image data based on the determined size of the receipt;

provide a user interface presenting a preview of the filtered image data in real; and store the filtered image data using the determined resolution.

11. The apparatus of claim 10, wherein the processing device is further to:

receive a second user input indicating a user request to take a photograph of the receipt;

take the photograph of the receipt;

apply the image filter to the photograph of the receipt to obtain a filtered photograph of the receipt; and store the filtered photograph of the receipt in the memory.

12. The apparatus of claim 11, wherein the processing device is further to:

generate additional contextual data associated with one or more of the photograph of the receipt or the filtered photograph of the receipt; and transmit one or more of the photograph of the receipt, the filtered photograph of the receipt, or the additional contextual data to a server device.

13. The apparatus of claim 10, wherein the processing device is further to:

receive second user input indicating a deactivation of the image filter; and provide the user interface presenting a second preview of a second image of the receipt before the photograph of the receipt is taken, wherein the second preview is based on the image data.

14. The apparatus of claim 10, wherein the user interface presents a second preview of the receipt simultaneously with the preview of the filtered image data, wherein the preview and the second preview are based on the image data and are presented before a photograph of the receipt is taken.

15. A non-transitory computer readable storage medium having instructions that, when executed by a processing device, cause the processing device to perform operations comprising:

receiving user input indicating an activation of an image filter;

receiving image data for a receipt and contextual data for the receipt, wherein the image data is from an image capture device and the contextual data comprises data of a past receipt;

calculating a distance to the receipt in view of one or more sensor devices of the image capture device;

determining a size of the receipt in view of the distance to the receipt and the contextual data comprising the data of the past receipt;

processing the image data in view of the image filter and the determined size of the receipt to obtain filtered image data;

determining a resolution for storing the filtered image data based on the determined size of the receipt;

providing, by the processing device, a user interface presenting a preview of the filtered image data in real time; and storing the filtered image data using the determined resolution.

16. The non-transitory computer readable storage medium of claim 15, wherein the processing device is further to:

receive a second user input indicating a user request to take a photograph of the receipt;

take the photograph of the receipt;

apply the image filter to the photograph of the receipt to obtain a filtered photograph of the receipt; and store the filtered photograph of the receipt in a memory.

17. The non-transitory computer readable storage medium of claim 16, wherein the processing device is further to:

generate additional contextual data associated with one or more of the photograph of the receipt or the filtered photograph of the receipt; and transmit one or more of the photograph of the receipt, the filtered photograph of the receipt, or the additional contextual data to a server device.

18. The non-transitory computer readable storage medium of claim 15, wherein the processing device is further to:

receive second user input indicating a deactivation of the image filter; and provide the user interface presenting a second preview of a second image of the receipt before the photograph of the receipt is taken, wherein the second preview is based on the image data.

19. The method of claim 1, wherein the preview of the filtered image data of the receipt is provided before a photograph of the receipt is taken and allows a user to refrain from taking the photograph after reviewing the preview.

20. The method of claim 1, wherein the image data indicates a category of the receipt and wherein the calculating the size of the receipt is in view of the distance to the receipt, the contextual data, and the category of the receipt.

* * * * *